United States Patent
Perreault

(10) Patent No.: US 10,869,023 B1
(45) Date of Patent: Dec. 15, 2020

(54) METHOD AND APPARATUS FOR CORRECTING LENTICULAR DISTORTION

(71) Applicant: GOOGLE LLC, Mountain View, CA (US)

(72) Inventor: John D. Perreault, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/448,135

(22) Filed: Jun. 21, 2019

(51) Int. Cl.
*G02B 30/27* (2020.01)
*H04N 13/327* (2018.01)
*H04N 13/366* (2018.01)
*H04N 13/305* (2018.01)
*G02B 27/00* (2006.01)

(52) U.S. Cl.
CPC ....... *H04N 13/327* (2018.05); *G02B 27/0093* (2013.01); *G02B 30/27* (2020.01); *H04N 13/305* (2018.05); *H04N 13/366* (2018.05)

(58) Field of Classification Search
CPC .. H04N 13/327; H04N 13/305; H04N 13/366; G02B 30/27; G02B 27/0093
See application file for complete search history.

(56) References Cited

U.S. PATENT DOCUMENTS

| | | | |
|---|---|---|---|
| 8,817,082 B2 | 8/2014 | Van Der Horst et al. | |
| 9,703,374 B1 | 7/2017 | Zhang | |
| 2010/0033680 A1* | 2/2010 | Krijn | H04N 13/327 353/8 |
| 2011/0310232 A1* | 12/2011 | Wilson | G09G 3/342 348/51 |
| 2014/0009579 A1 | 1/2014 | Sumi et al. | |
| 2016/0378218 A1 | 12/2016 | Lo | |

FOREIGN PATENT DOCUMENTS

| | | |
|---|---|---|
| CN | 108540794 A | 9/2018 |
| EP | 2541953 A2 | 1/2013 |
| WO | 2008075258 A1 | 6/2008 |
| WO | 2019132660 A1 | 7/2019 |

OTHER PUBLICATIONS

International Search Report and Written Opinion dated Feb. 21, 2020 for corresponding International Application No. PCT/US2019/064106, 15 pages.

* cited by examiner

Primary Examiner — John R Schnurr

(57) ABSTRACT

A method includes capturing an image of a lenticular display, generating a lenticular distortion map of the lenticular display using the image, and compensating for a lenticular distortion of the lenticular display using the lenticular distortion map. The lenticular distortion map is a dual-component lenticular distortion map and the image is a fringe pattern. The method compensates for the lenticular distortion by adjusting a swizzle function based on the lenticular distortion map.

20 Claims, 12 Drawing Sheets

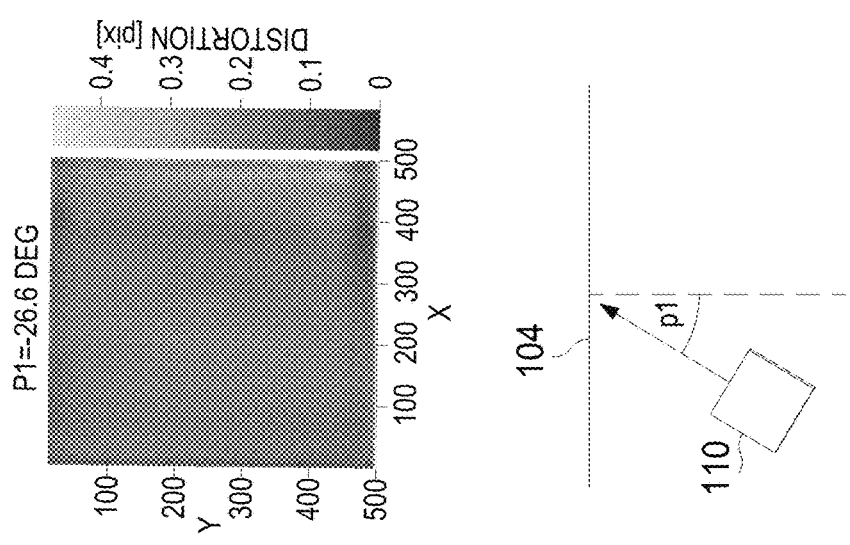
FIG. 6
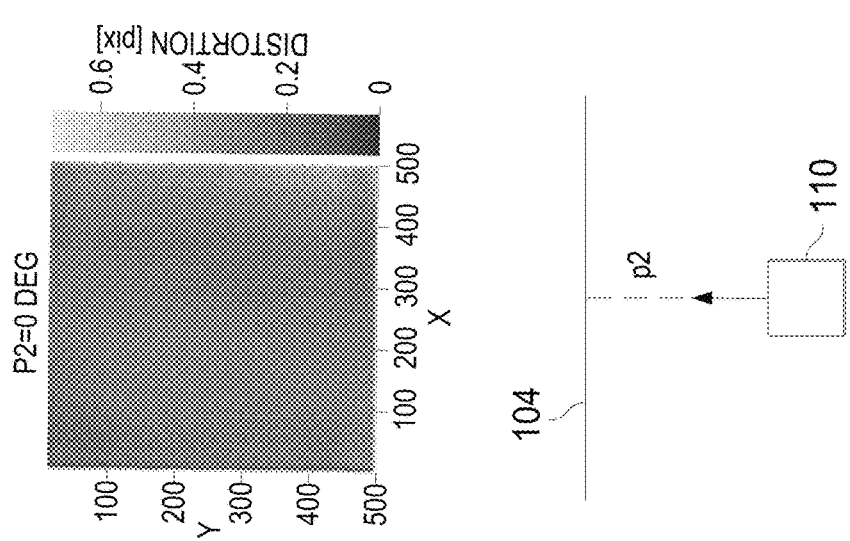
FIG. 7
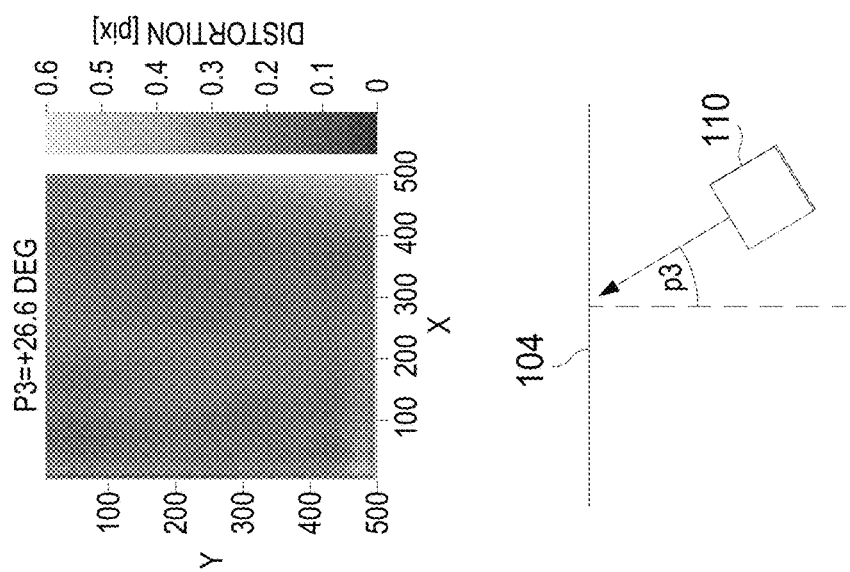
FIG. 8
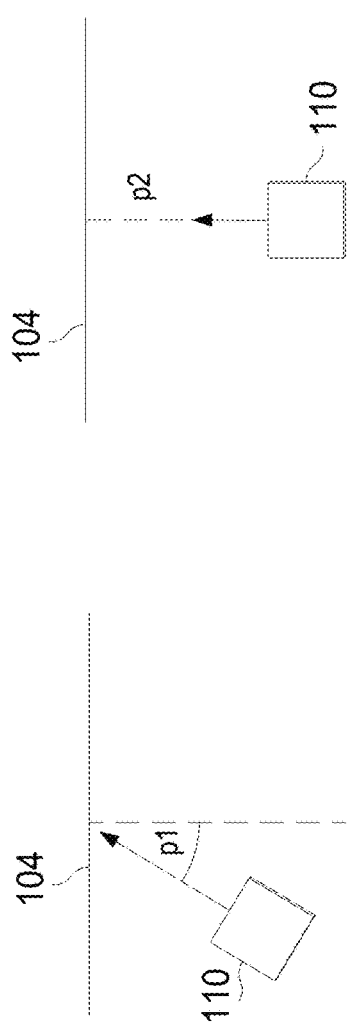
FIG. 9
FIG. 10
FIG. 11

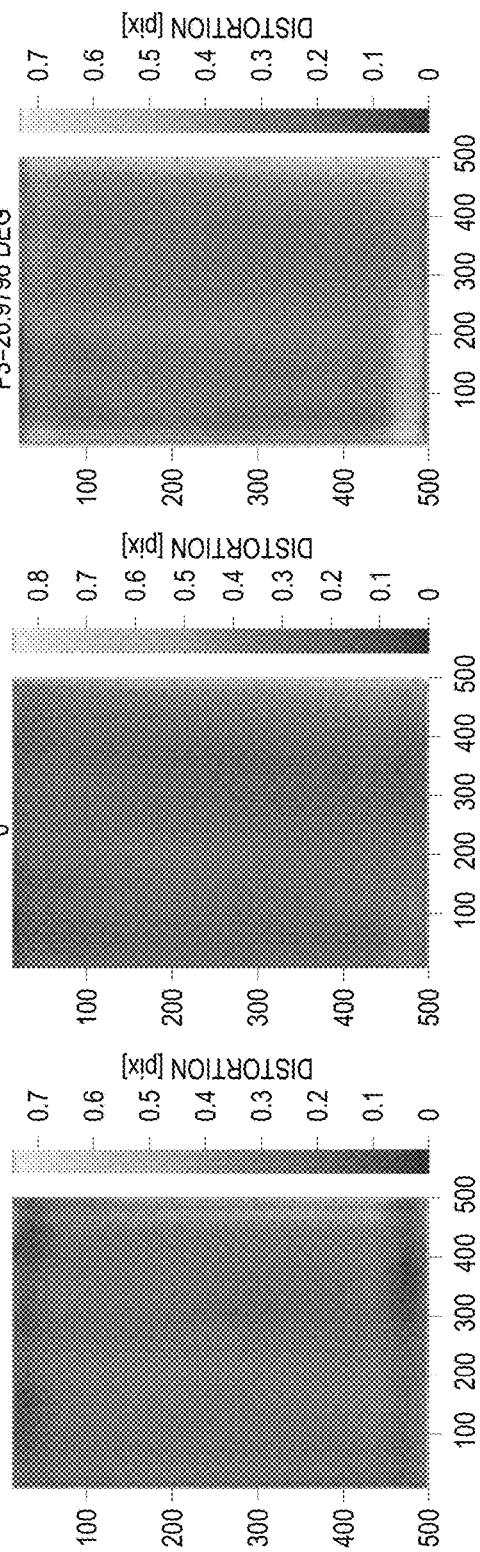
FIG. 12
FIG. 13
FIG. 14
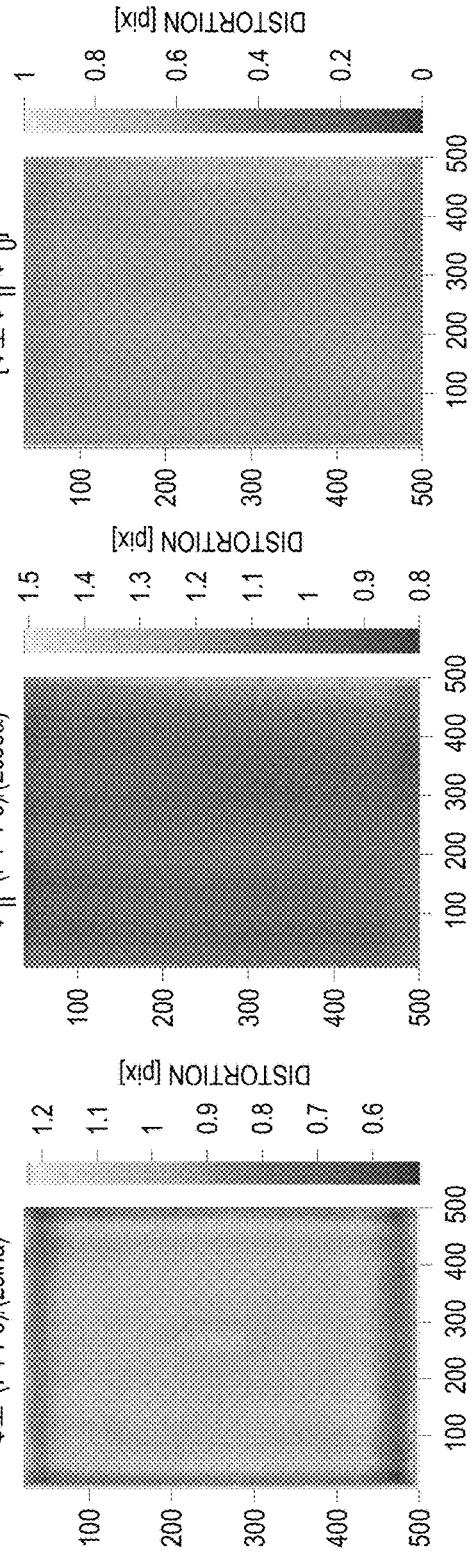
FIG. 15
FIG. 16
FIG. 17

METHOD AND APPARATUS FOR CORRECTING LENTICULAR DISTORTION

BACKGROUND

Lenticular distortion frequently occurs in lenticular autostereoscopic displays due to inconsistencies in the manufacture or positioning of the lenticular sheet that overlaps the display. Defects related to the physical attributes of the lenticular sheet that generally occur during the manufacturing process cause errors in the three-dimensional (3D) image viewed by an observer of the autostereoscopic display. When, for example, a lenticular display has been manufactured uniformly and is operating appropriately, the observer is able to view the 3D image without noticeable distortion effects, resulting in distinct separated views emitted by the display that are sensed by the left and right eyes. However, when the lenticular display is manufactured with lenticular defects, distortion is created which causes crosstalk between the left and right images displayed to the observer of the lenticular display. Uncorrected lenticular distortions manifest into ghost images that result in eye-strain by the observer of the lenticular display.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 6 depicts a lenticular distortion map of the lenticular display of FIG. 1 associated with an angle of the lenticular distortion tracking camera in accordance with at least one embodiment.

FIG. 7 depicts a lenticular distortion map of the lenticular display of FIG. 1 associated with an angle of the lenticular distortion tracking camera in accordance with at least one embodiment.

FIG. 8 depicts a lenticular distortion map of a lenticular display associated with an angle of a lenticular distortion tracking camera in accordance with at least one embodiment.

FIG. 9 depicts the position of the lenticular distortion tracking camera used to measure the lenticular distortion map of FIG. 6 in accordance with at least one embodiment.

FIG. 10 depicts the position of the lenticular distortion tracking camera used to measure the lenticular distortion map of FIG. 7 in accordance with at least one embodiment.

FIG. 11 depicts the position of the lenticular distortion tracking camera used to measure the lenticular distortion map of FIG. 8 in accordance with at least one embodiment.

FIG. 12 depicts a lenticular distortion map of the lenticular display of FIG. 1 associated with an angle of the lenticular distortion tracking camera in accordance with at least one embodiment.

FIG. 13 depicts a lenticular distortion map of the lenticular display of FIG. 1 associated with an angle of a lenticular distortion tracking camera in accordance with at least one embodiment.

FIG. 14 depicts a lenticular distortion map of the lenticular display of FIG. 1 associated with an angle of a lenticular distortion tracking camera in accordance with at least one embodiment.

FIG. 15 depicts a perpendicular component of a lenticular distortion map associated with the lenticular display of FIG. 1 in accordance with at least one embodiment.

FIG. 16 depicts a parallel component of a lenticular distortion map of the lenticular display of FIG. 1 in accordance with at least one embodiment.

FIG. 17 depicts a dual-component lenticular distortion map of the lenticular display of FIG. 1 in accordance with at least one embodiment.

DETAILED DESCRIPTION

FIGS. 1-23 illustrate example devices and techniques for compensating for lenticular distortion in an autostereoscopic display that displays three-dimensional (3D) images. A computer workstation includes the autostereoscopic display that has a lenticular sheet overlapping the display panel of the autostereoscopic display. In order to correct lenticular distortion caused by, for example, deformities in the lenticular sheet, a lenticular distortion tracking camera captures fringe patterns of the lenticular display from various perspectives or angles in front of the lenticular display that correspond to the positioning of the viewer of the lenticular display. By capturing images of the fringe patterns of the lenticular display at each angle, the lenticular distortion tracking camera is able to ascertain the intensity patterns associated with the fringe patterns. The intensity patterns are used to generate lenticular distortion maps that are used to generate a dual-component lenticular distortion map that is a function of the position of the head of the user or viewer of the display. The dual-component lenticular distortion map is used by a swizzle function to adjust the images seen by the viewer to compensate for the lenticular distortion. As a result, the observer is able to view the 3D images without lenticular distortion in real-time, thereby enhancing the user experience with 3D based video-based communication and other 3D applications.

Figure 1:
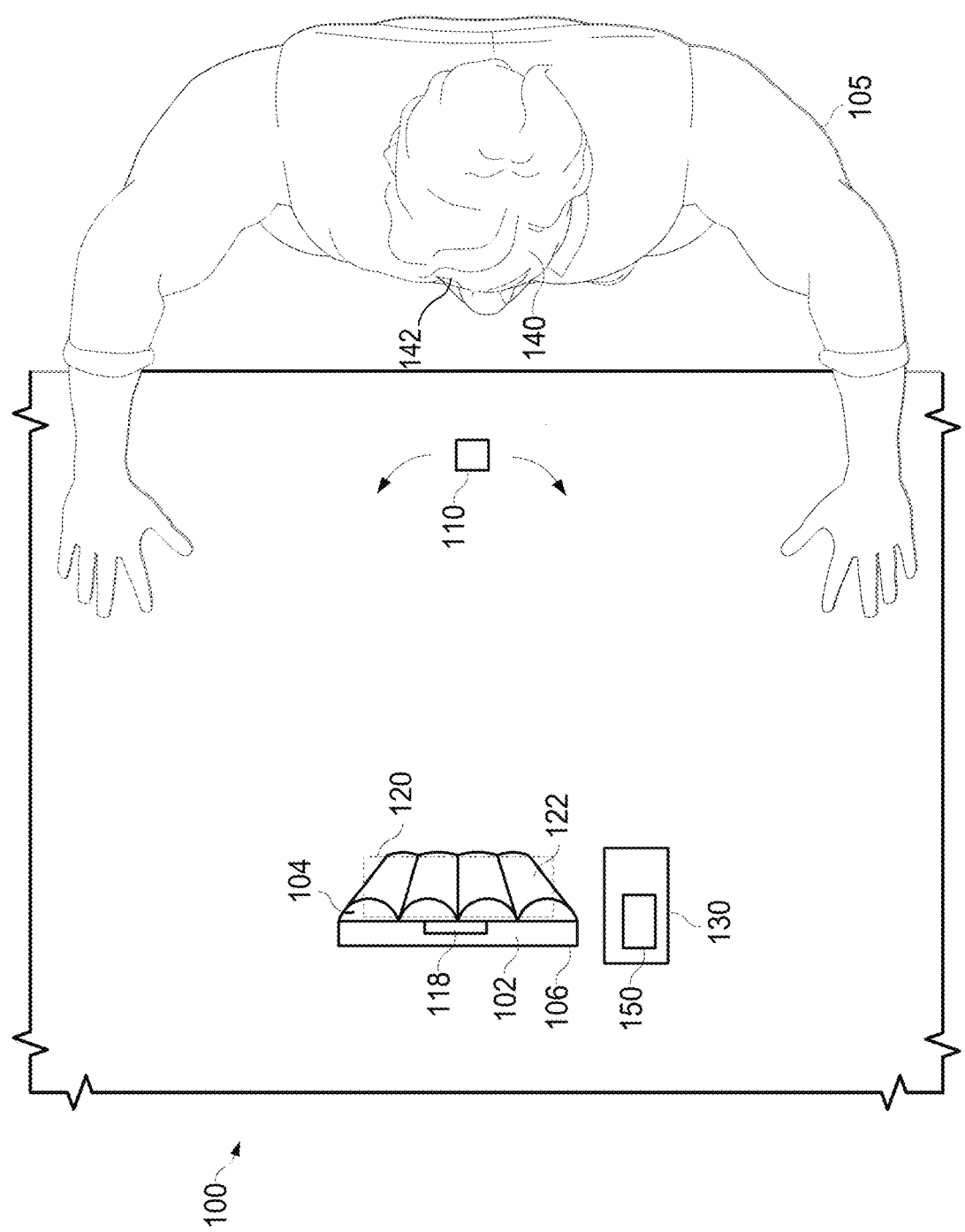
FIG. 1 is a diagram of a top view of a computer workstation including a perspective view of a lenticular autostereoscopic display in accordance with some embodiments.

FIG. 1 illustrates a top view of a workstation 100 in accordance with some embodiments. The workstation 100 is described herein with respect to an example implementation in a 3D system for video communication. However, it will be appreciated that in different embodiments the workstations 100 can be employed in a variety of implementations and applications that may include lenticular displays, including, for example, virtual reality and augmented reality display systems, computer gaming systems, general computing applications, and the like.

As illustrated, the workstation 100 includes an autostereoscopic display 106 and a desktop 130. The desktop 130 includes a processor 150. The autostereoscopic display 106 includes a head tracking module 118 and a lenticular display 102. The lenticular display 102 includes a display panel 104 and a lenticular sheet 122. The display panel 104 includes an orthogonal array of display pixels arranged in rows and columns. The lenticular sheet 122 includes a lenticular array 120. A lenticular distortion tracking camera 110, that may or may not serve as part of workstation 100, is positioned in front of the lenticular display 102 to conduct measurements used for lenticular distortion correction, as described further below.

As illustrated in FIG. 1, the lenticular display 102 is a flat display covered by the lenticular sheet 122 that includes the lenticular array 120. The lenticular array 120 includes a plurality of microlenses, with each lens overlying a region, or a portion of a region, of the display panel 104. Each lens of the lenticular array 120 is positioned as to create the appearance of a 3D image from a two-dimensional image rendered at the lenticular display 102. In other embodiments, the autostereoscopic display 106 may be another type of autostereoscopic display, i.e., a display including both a parallax barrier and the lenticular array, a display where individual light emitting elements emit light in specific angle such that one eye of a viewer 105 can be illuminated without significantly illuminating the other eye, a compressive light field display, holographic display and the like.

During operation, processor 150 of the workstation 100 is configured to generate display frames on the autostereoscopic display 106 to create the impression of a 3D image for a viewer 105. Thus, for example, in at least one embodiment the lenticular display 102 includes a liquid crystal display (LCD) or organic light-emitting diode (OLED) display and the lenticular array 120 overlying the display panel 104. In various embodiments, the processor 150 is a processing device, such as a central processing unit (CPU), a graphics processing unit (GPU), neural network processor, or a combination thereof, configured to execute operations for the workstation 100 as described further herein. It will be appreciated that although for clarity the processor 150 is illustrated as a single processor, in some embodiments the processor 150 can represent multiple processing units, with each processing unit including one or more processor cores or other compute units. For example, in at least one embodiment the processor 150 represents at least one CPU having multiple processor cores and at least one GPU having multiple single-instruction multiple data (SIMD) compute units configured to execute graphical operations. As described further herein, the processor 150 is configured to correct lenticular distortion that occurs as a result of, for example, defects in the manufacture or positioning of the lenticular array 120 over the display panel 104.

To generate the display frames, the microlenses of the lenticular array 120 generate a first display image viewable from a first location and a second display image viewable from a second location. A stereoscopic 3D image is produced by display panel 104 by rendering the first display image on a portion of a grid of pixels so as to be viewed through the lenticular array 120 from a first location corresponding to the location of a first eye of the user and a second display image on a portion of the grid of pixels so as to be viewed through the lenticular array 120 from a second location corresponding to the location of a second eye of the user such that the second display image represents a depth shift from the first display image to simulate parallax.

For example, the grid of pixels may display a first display image intended to be seen through the lenticular array 120 by the left eye of a participant and the grid of pixels may display a second display image intended to be seen through the lenticular array 120 by the right eye of the participant. The first and second locations can be based on a location (e.g., a lateral/vertical location, a position, a depth, a location of a left or right eye) of the viewer with respect to the display. In some implementations, first and second directions for generating the first and second display images can be determined by selecting certain pixels from an array of pixels associated with the lenticular array 120.

Processor 150 selects a set of outgoing rays through which an image may be viewed through the microlenses to display the left eye image and the right eye image based on location information corresponding to the position of the viewer 105 relative to display panel 104 (the location may be captured by head tracking module 118 consistent with disclosed implementations). In various embodiments, each of a plurality of microlenses can cover (e.g., can be disposed over or associated with) some number of pixels, such that each pixel is visible from some limited subset of directions in front of the display panel 104. When the location of the head 140 of the observer (viewer 105) is known, the subset of pixels under each lens (across the entire display panel 104) that is visible from one eye, and the subset of pixels across the display panel 104 that is visible from the other eye can be identified. By selecting for each pixel the appropriate rendered image corresponding to the virtual view that would be seen from the viewer's eye locations, each eye can view the appropriate image.

In order to correct the lenticular distortion caused by, for example, deformities in the lenticular sheet prior to rendering the images for appropriate view by viewer 105, head tracking module 118 determines the position of the head 140 of viewer 105 relative to the lenticular display 102. By ascertaining the position of the head 140 of viewer 105, the head tracking module 118 is able to provide the processor 150 with the angular position of the head of viewer 105 to update a swizzle function (described further below with reference to FIG. 2) that is configured to reduce the amount of lenticular distortion seen by viewer 105. Processor 150 uses the current angular position of the head of the viewer 105 and lenticular display parameters to update a dual-component lenticular distortion map. In various embodiments, the lenticular display parameters are parameters that are used to describe the lenticular display and the position of the head of viewer 105. In various embodiments, the lenticular display parameters include, for example, a lenticular pitch d of the lenticular lenses of the lenticular array 120, a lenticular angle θ (i.e., the lenticular slant angle), a lenticular focal length f, a nominal distance z of the viewer 105 from the display panel 104, and a pixel pitch p. Of the lenticular display parameters, the head tracking module 118 is configured to ascertain the nominal distance from the display panel 104 to the head 140 of the viewer 105. The dual-component lenticular distortion map and the lenticular display parameters are used to modify the swizzle function to detect and correct lenticular distortion observed by the viewer 105 from the viewpoint of viewer 105.

Figure 2:
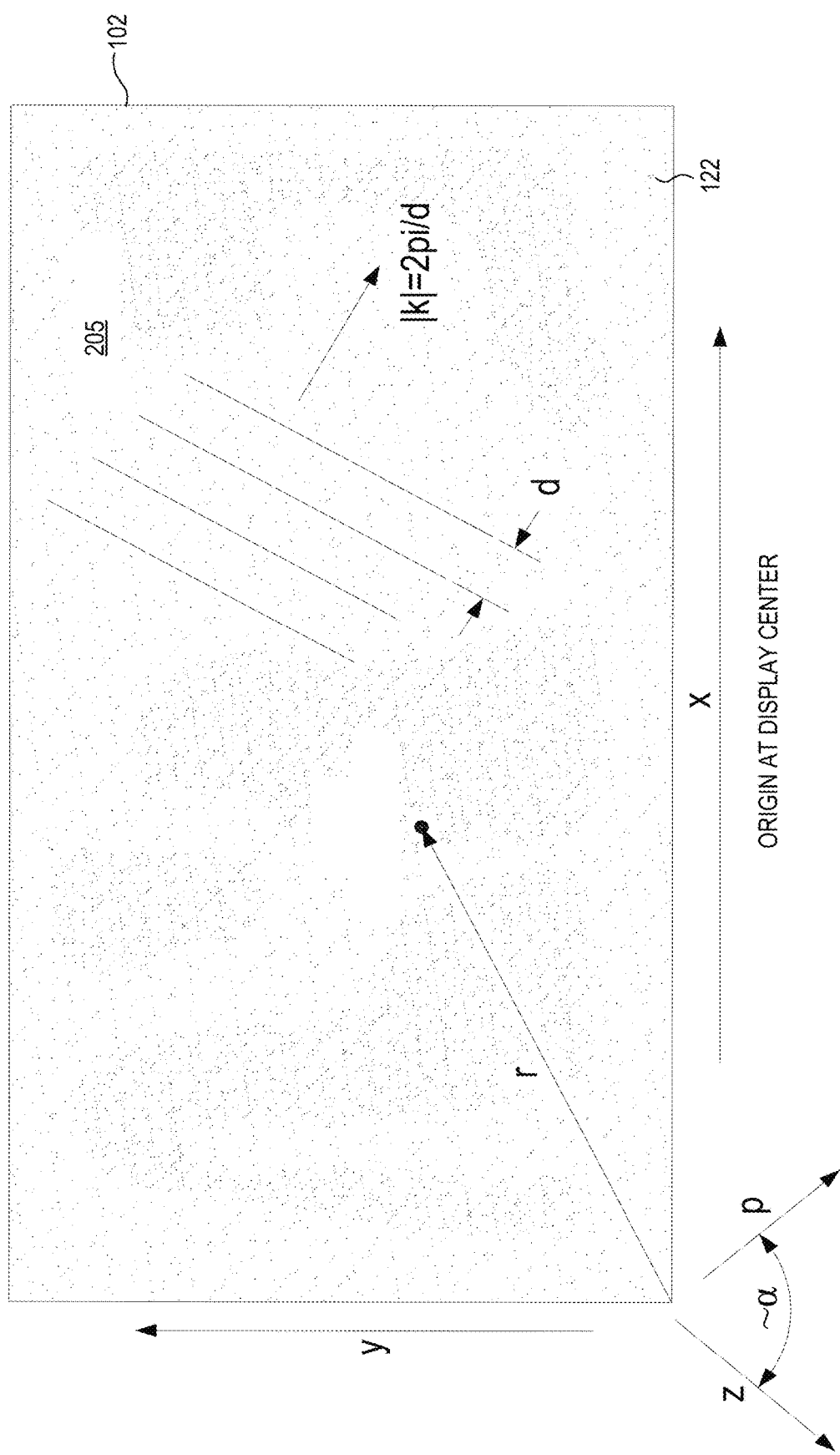
FIG. 2 is a front view of the lenticular autostereoscopic display of FIG. 1 with red-green-blue (RGB) texture encoded lenticular distortion maps in accordance with at least one embodiment.
Figure 3:
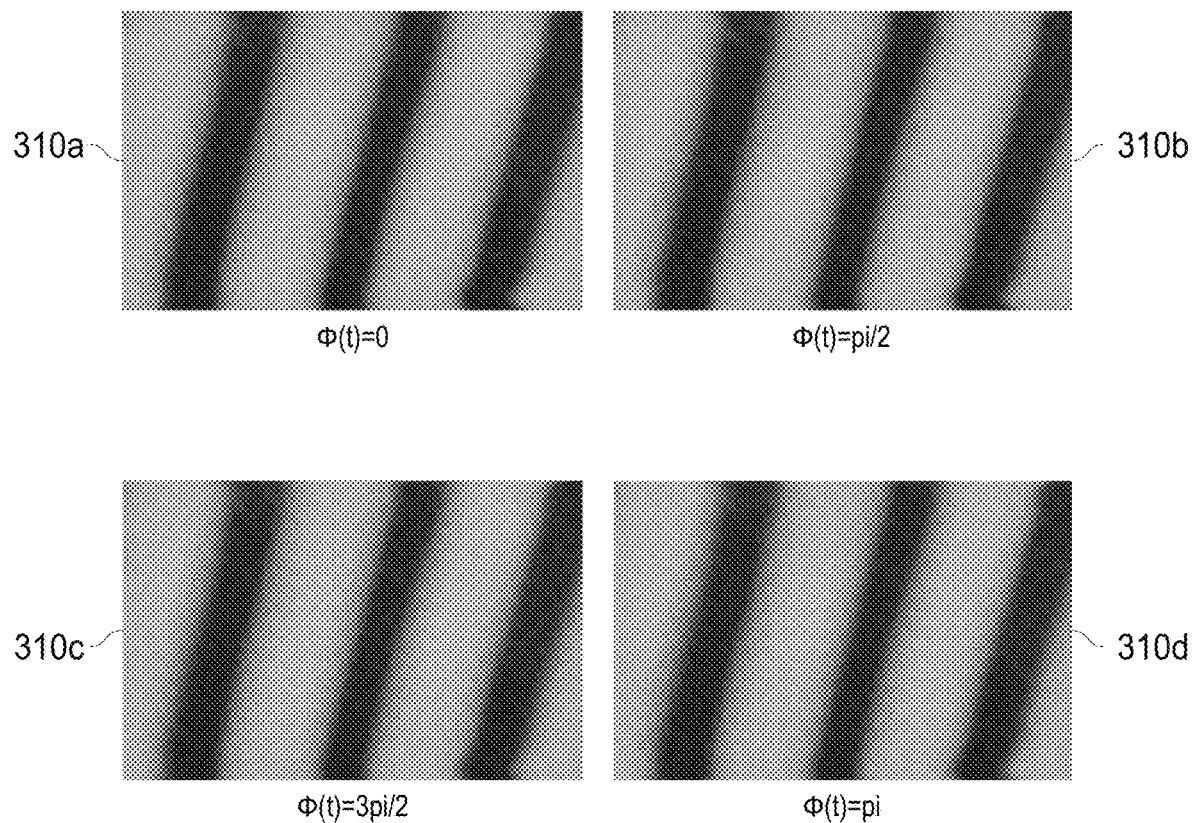
FIG. 3 depicts fringe patterns displayed on the lenticular display of FIG. 1 taken by a lenticular distortion tracking camera in accordance with at least one embodiment.
Figure 4:
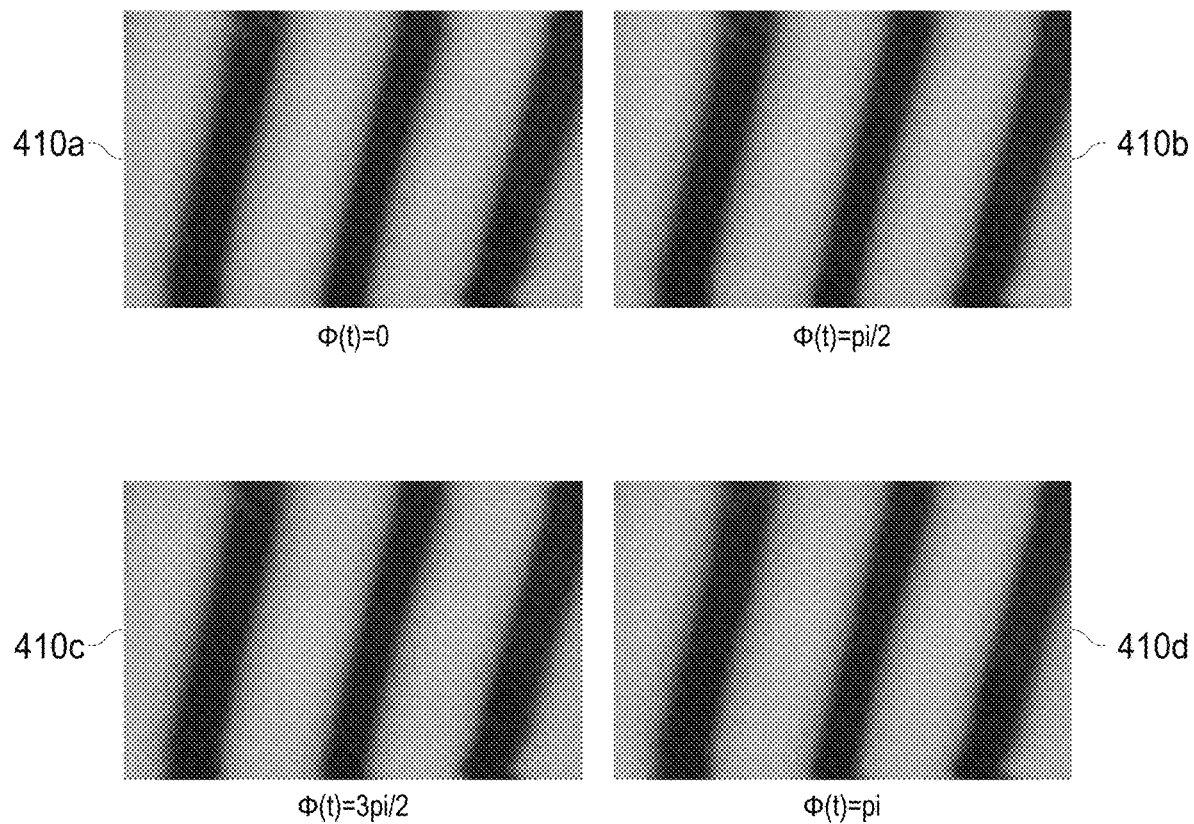
FIG. 4 depicts fringe patterns displayed on the lenticular display of FIG. 1 taken by a lenticular distortion tracking camera in accordance with at least one embodiment.
Figure 4:
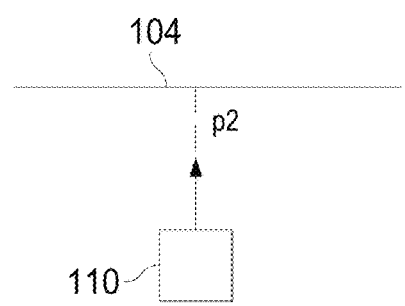
Figure 5:
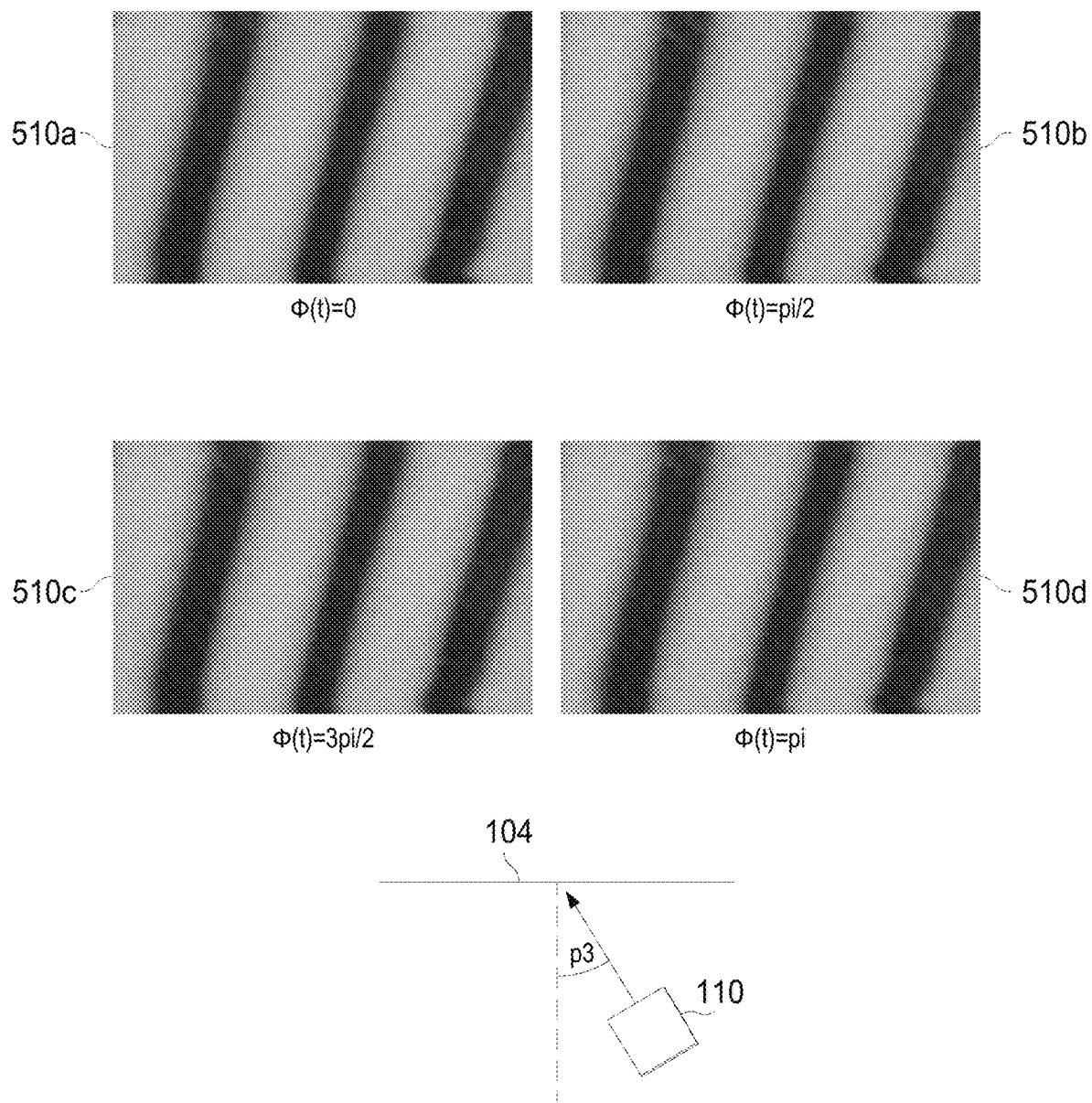
FIG. 5 depicts fringe patterns displayed on the lenticular display of FIG. 1 taken by lenticular distortion tracking camera in accordance with at least one embodiment.

FIG. 2 illustrates an example of lenticular display 102 with lenticular distortion maps encoded as RGB texture 205 generated using the lenticular distortion tracking camera 110 of FIG. 1 in accordance with at least one embodiment. As depicted in FIG. 2, the level of distortion associated with the lenticular sheet 122 is depicted by the density of the dots displayed on lenticular display 102. With reference to FIG. 1 and FIGS. 3-5, in order to generate the distortion maps that are used in the swizzle function to rectify the lenticular distortion, phase shifting interferometry measurements of fringe patterns displayed on lenticular display 102 (as depicted at FIGS. 3-5) are taken using lenticular distortion tracking camera 110 and are provided to processor 150 to update the swizzle function. The swizzle function is adjusted using the lenticular display parameters and phase shifting interferometry measurements in order to eliminate lenticular distortion in the image in real-time from the perspective of the viewer 105.

In various embodiments, the swizzle function, S, is defined for each pixel of the display panel 104 and is a function of the input parameters $\vec{k}$, $\vec{r}$, $\Phi$, where $\vec{k}$ is a lenticular wave vector, $\hat{r}$ is the pixel location, and $\Phi$ is the lenticular distortion map. The lenticular distortion map $\Phi$ is a function of x, y, and α, where x corresponds to the location of the pixel in the x-direction, y corresponds to the location of the pixel in the y direction, and α is the observation angle of the viewer 105, which is a function of unit vectors $\hat{p}$ and $\hat{r}$, as shown below:

$$S(\vec{k} \cdot \vec{r} + \varphi(x,y,\alpha)) \qquad \text{Eq. 1}$$

where α is $$\alpha = \frac{\pi}{2} - \cos^{-1}(\hat{p} \cdot \hat{k}) \qquad \text{Eq. 2}$$

A primary objective of the swizzle function is to allow the processor 150 to use the lenticular distortion map $\Phi(x, y, \alpha)$ to keep the swizzle function uniform and periodic in order to compensate for lenticular distortion. Note that when the lenticular sheet 122 does not have deformities, there is no corresponding lenticular distortion and the swizzle function remains a uniform, periodic function, such as, for example, a regular square wave, or a cosine wave. Thus, when viewer 105 is viewing the lenticular display and there is not lenticular distortion from the perspective of the viewer 105, the uniformity and periodicity of the swizzle function is maintained by processor 150. As a result, when there is no lenticular distortion, the swizzle function is not adjusted by the lenticular distortion map $\Phi(x, y, \alpha)$.

When the lenticular sheet 122 has deformities and there is associated lenticular distortion that can be viewed from the location of the viewer 105, the lenticular distortion map $\Phi(x, y, \alpha)$ adjusts the swizzle function (i.e., contracts or expands the original swizzle function) to maintain the uniformity and periodicity of the swizzle function in order to provide 3D images that are free from lenticular distortion from the viewpoint of the viewer 105. Thus, the lenticular distortion map is configured to adjust the swizzle function and maintain uniformity when there is lenticular distortion caused by the lenticular sheet 122.

In various embodiments, as can be seen from equation 1 (Eq. 1), the distortion map, denoted as $\Phi(x, y, \alpha)$ above, is added to the swizzle function to maintain the uniformity of the swizzle function (i.e., stretch or compress the swizzle function) depending upon the measurements attained for the distortion map. That is, a lenticular distortion map is added to the swizzle function to correct for lenticular distortion by adjusting the swizzle function based upon the distortion map measurements.

As stated previously, in order to measure the distortion map, a phase shifting interferometry technique is used by processor 150. The phase shifting interferometry technique suppresses common mode systematics (i.e., stray light) and spatial non-uniformities. Using the phase shifting interferometry technique, a fringe pattern is displayed on lenticular display 102 at specific angles or positions p1, p2, and p3, of lenticular distortion tracking camera 110 (depicted in FIGS. 3-5). At each angle, the fringe pattern is shifted to four different phases $$\left(e.g., 0, \frac{\pi}{2}, \pi, \frac{3\pi}{2}\right).$$

that are multiples of, for example, $$\frac{\pi}{2}.$$

Using me phase sinning interferometry technique, four different intensity maps (e.g., $I_1(x, y)$, $I_2(x, y)$, $I_3(x, y)$, $I_4(x, y)$) are ascertained that correspond to each phase. The four intensity maps are combined to generate the distortion maps (e.g., $\Phi_{p1}$, $\Phi_{p2}(x, y)$, $\Phi_{p2}(x, y)$, and $\Phi_{p3}(x, y)$) for each angle. By combining the four intensity maps, the distortion map $\Phi(x, y, \alpha)$ is recovered. An example of the intensity maps computed by processor 150 for four different phases are shown below.

$$I(x, y) = I_0 + I'\cos[\Phi(x, y) + \Phi(t)] \qquad \text{Eq. 3}$$

$$I_1(x, y) = I_0 + I'\cos[\Phi(x, y)] \text{ for } \Phi(t) = 0 \qquad \text{Eq. 4}$$

$$I_2(x, y) = I_0 - I'\sin[\Phi(x, y)] \text{ for } \Phi(t) = \frac{\pi}{2} \qquad \text{Eq. 5}$$

$$I_3(x, y) = I_0 - I'\cos[\Phi(x, y)] \text{ for } \Phi(t) = \pi \qquad \text{Eq. 6}$$

$$I_4(x, y) = I_0 + I'\sin[\Phi(x, y)] \text{ for } \Phi(t) = \frac{3\pi}{2} \qquad \text{Eq. 7}$$

where the inverse of $$\tan[\Phi(x, y)] = \frac{I_4(x, y) - I_2(x, y)}{I_1(x, y) - I_3(x, y)} \qquad \text{Eq. 8}$$

is used to solve for $\Phi(x, y)$, where $$\Phi(x, y) = \tan^{-1}\left(\frac{I_4(x, y) - I_2(x, y)}{I_1(x, y) - I_3(x, y)}\right) \qquad \text{Eq. 9}$$

Thus, by combining the intensity patterns the tangent of $\Phi(x, y)$, i.e., $\tan[\Phi(x, y)]$, is ascertained. The inverse tangent of $\Phi(x, y)$ is then used to ascertain the distortion measurements for each angle, i.e., $\Phi_{p1}(x, y)$, $\Phi_{p2}(x, y)$, and $\Phi_{p3}(x, y)$. The distortion measurements $\Phi)_{p1}(x, y)$, $\Phi)_{p2}(x, y)$, and $\Phi_{p3}(x, y)$ are then used to generate lenticular distortion map $\Phi(x, y, \alpha)$ in the form of two components, $\Phi_{\|}(x, y)$ and $\Phi_{\perp}(x, y)$.

In order to ascertain the lenticular distortion map $\Phi(x, y)$ in the form of two components, $\Phi_{\|}(x, y)$ and $\Phi_{\perp}(x, y)$, the distortion map measurements $\Phi_{p1}(x, y)$, $\Phi_{p2}(x, y)$, and $\Phi_{p3}(x, y)$ for each angle p1, p2, and p3 are configured to generate $\Phi(x, y, \alpha)$. The two component (i.e., $\Phi_{\|}(x, y)$ and $\Phi_{\perp}(x, y)$) representation of $\Phi(x, y, \alpha)$ is depicted in equation shown below.

$$\Phi(x, y, \alpha) = \cos(\alpha)\Phi_{\|}(x, y) + \sin(\alpha)\Phi_{\perp}(x, y) \qquad \text{Eq. 10}$$

where $$\Phi_{\|}(x, y) = \frac{\Phi_{p1}(x, y) + \Phi_{p3}(x, y)}{(2/\cos(\alpha))} \qquad \text{Eq. 11}$$

and $$\Phi_{\perp}(x, y) = \frac{\Phi_{p1}(x, y) - \Phi_{p3}(x, y)}{(2/\cos(\alpha))} \qquad \text{Eq. 12}$$

where p1, p2, and p3 represent viewing angles of the lenticular distortion tracking camera 110 (as depicted in FIGS. 3-5).

As can be seen from Eq. 11, in order to ascertain the lenticular distortion map $\Phi(x, y, \alpha)$ in the form of two components, $\Phi_{\|}(x, y)$ and $\Phi_{\perp}(x, y)$, the distortion map measurements $\Phi_{p1}(x, y)$, $\Phi_{p2}(x, y)$, and $\Phi_{p3}(X, y)$ for each angle p1, p2, and p3 are added together to generate $\Phi_{\|}(x, y)$. Similarly, in order to generate the perpendicular component $\Phi_{\perp}(x, y)$, the lenticular distortion components $\Phi_{p1}(x, y)$, $\Phi_{p2}(x, y)$, and $\Phi_{p3}(x, y)$ are subtracted for each angle p1, p2, and p3, as depicted in equation 12.

Thus, as can be seen from equation 10, the dual-component lenticular distortion map $\Phi(x, y)$ is now a function of a, which corresponds to the angle of the head location (headpose) of the viewer 105 to the display panel 104.

In various embodiments, the angles p1 and p3 selected for the determination $\Phi_{p1}(X, y)$ and $\Phi_{p3}(X, y)$ initial are opposing viewing angles, i.e., p1=-p3. For example, three different angles may include a normal incidence to the display, p2=0, a positive angle of incidence to the display, p3=+α (positive alpha incident to the display), and negative angle of incidence to the display, p1=-α (negative alpha incident to the display).

Using equations 10-12, the lenticular distortion map measurements $\Phi_{p1}(x, y)$, $\Phi_{p2}(x, y)$, and $\Phi_{p3}(x, y)$ for p1, p2, and p3, taken by lenticular distortion tracking camera 110 are used by processor 150 to reconstruct the out-of-plane distortion map and in-plane distortion map. As can be seen from equations 11 and 12, reconstruction of the out-of-plane distortion map and in-plane distortion map occurs by either adding or subtracting the measurements previously taken by the lenticular distortion tracking camera 110 and dividing by either $2\cos(\alpha)$ or $2\sin(\alpha)$.

In various embodiments, for example, when the viewer 105 is viewing lenticular display 102 from a first vantage point, the distortion and corresponding lenticular distortion map value varies from when the viewer 105 has moved her/his head 140 and is viewing the display from a second vantage point. That is, the value or output of $\Phi(x, y, \alpha)$ is dependent on the location of the head of the viewer 105 and for every pixel location on the screen, there is a particular value of $\Phi(x, y, \alpha)$.

Using lenticular distortion tracking camera 110 and processor 150, the value of $\Phi(x, y, \alpha)$ is continuously updated while the viewer 105 is viewing the lenticular display 102. Because the value of $\Phi(x, y, \alpha)$ is continuously updated in real-time, the swizzle function is also continuously updated over time while the viewer 105 is viewing the lenticular display 102. That is, as the viewer 105 is looking at the display panel 104 and moving their head around, the distortion map $\Phi(x, y, \alpha)$ and the swizzle function are constantly being updated by processor 150 to correct for lenticular distortion.

FIGS. 3-5 illustrate fringe patterns displayed on a lenticular display 102 taken by lenticular distortion tracking camera 110 according to various embodiments. To generate the lenticular distortion maps $\Phi_{p1}(x, y)$, $\Phi_{p2}(x, y)$, and $\Phi_{p3}(x, y)$ of the dual-component lenticular distortion map $\Phi(x, y, \alpha)$, the lenticular distortion tracking camera 110 is configured to capture the fringe patterns 310a-310d, 410a-410d, and 510a-510d of lenticular display 102 at positions or angles (e.g., p1, p2, and 3) and phases $$\left(e.g., 0, \frac{\pi}{2}, \pi, \frac{3\pi}{2}\right).$$

For example, lenticular distortion tracking camera 110 may be located at a first angular position p1 (depicted as p1 in FIG. 3), at a second angular position p2 (depicted as p2 in FIG. 4), and a third angular position p3 (depicted as p3 in FIG. 5) relative to the lenticular display 102. The fringe patterns are used to ascertain phase shifting interferometry measurements (described above with respect to FIG. 2) of the images taken by lenticular distortion tracking camera 110. That is, the lenticular distortion tracking camera 110 captures images of fringe patterns at the plurality of phases and uses the fringe patterns to generate intensity patterns in equations 4-7. The phase interferometry measurements are used to solve for the lenticular distortion map $\Phi(x, y, \alpha)$ of the swizzle function that is configured to correct the lenticular distortion associated with lenticular display 102.

By capturing phase shifting interferometry measurements using the fringe patterns displayed on lenticular display 102, as well as the lenticular display parameters, processor 150 is able to continuously update the swizzle function that is used for lenticular distortion correction while the viewer 105 is viewing the 3D images on the lenticular display 102. As stated previously, continuous updating of the swizzle function thereby allows the rendering corrected 3D images or display frames on lenticular display 102 for view by viewer 105 in real time.

FIGS. 6-8 illustrate lenticular distortion map measurements $\Phi_{p1}(x, y)$, $\Phi_{p2}(x, y)$, and $\Phi_{p3}(x, y)$ that correspond to the angles p1, p2, and p3 of FIGS. 9-11, respectively. FIGS. 9-11 illustrate examples of the positioning lenticular distortion tracking camera 110 at various angles p1, p2, and p3, respectively. For example, FIG. 6 depicts the lenticular distortion map measurement $\Phi_{p1}(x, y)$ for an angle of p1=-26.6 degrees depicted in FIG. 9. FIG. 7 depicts the lenticular distortion map measurement $\Phi_{p2}(x, y)$ for an angle of p2=0 degrees depicted in FIG. 10. FIG. 8 depicts the lenticular distortion measurement $\Phi_{p3}(x, y)$ for an angle of p3=26.6 degrees depicted in FIG. 11. The lenticular distortion maps $\Phi_{p1}(x, y)$, $\Phi_{p2}(x, y)$, and $\Phi_{p3}(x, y)$ depicted in FIGS. 6-8 are examples of lenticular distortion maps that can be used to ascertain $\Phi(x, y, \alpha)$.

FIGS. 12-14 illustrate the lenticular distortion map measurements $\Phi_{p1}(x, y)$, $\Phi_{p2}(x, y)$, and $\Phi_{p3}(x, y)$ associated with the lenticular display 102 for angles p1, p2, and p3 of a lenticular distortion tracking camera 110 in accordance with at least one embodiment. FIG. 15 illustrates the lenticular distortion map $\Phi_\perp(x, y)$ associated with the perpendicular component of the dual-component lenticular distortion map $\Phi(x, y, \alpha)$ in accordance with at least one embodiment. FIG. 16 illustrates the lenticular distortion map $\Phi_\parallel(x, y)$ associated with the parallel component of the dual-component lenticular distortion map $\Phi(x, y, \alpha)$ in accordance with at least one embodiment. FIG. 17 illustrates dual-component lenticular distortion map $\Phi(x, y, \alpha)$ associated with lenticular display 102 in accordance with at least one embodiment.

In FIGS. 12-14, the lenticular distortion map measurements $\Phi_{p1}(x, y)$, $\Phi_{p2}(x, y)$, and $\Phi_{p3}(X, y)$ for the first angle p1, the second angle at p2, and a third angle at p3, respectively, have been ascertained by the lenticular distortion tracking camera 110. In this case, as described in Eq. 12, in order to recover $\Phi_\perp(x, y)$, the third measurement p3 is subtracted from the first measurement and divided by 2 sin(a), which yields the out-of-plane lenticular distortion map. As similarly depicted in Eq. 11, in order to recover $\Phi_\perp(x, y)$, the third measurement p3 is added to the first measurement and divided by 2 cos (a), which yields the in-plane lenticular distortion map $\Phi_\parallel(x, y)$.

In FIG. 17, the in-plane lenticular distortion map $\Phi_\parallel(x, y)$ and out-of-plane lenticular distortion map $\Phi_\perp(x, y)$ are combined to reconstruct the lenticular distortion map $\Phi(x, y, \alpha)$. That is, the lenticular distortion map $\Phi(x, y, \alpha)$ is reconstructed from the two components $\Phi_\perp(x, y)$ and $\Phi_\parallel(x, y)$. The dual-component lenticular distortion map $\Phi(x, y, \alpha)$ of Eq. 10, and thus the swizzle function of Eq. 1, is constructed using viewing angle corresponding to the head 140 of the viewer 105. For the example depicted in FIG. 12, a first lenticular distortion map measurement $\Phi_{p1}(x, y)$ is depicted at an angle of p1=−26.9796 degrees, a second lenticular distortion map measurement $\Phi_{p2}(X, y)$ is depicted at an angle of p2=0, and a third lenticular distortion map measurement $\Phi_{p3}(x, y)$ is depicted at an angle p3=+26.9796 degrees. The three lenticular distortion maps $\Phi_{p1}(x, y)$, $\Phi_{p2}(x, y)$, and $\Phi_{p3}(x, y)$ taken at angles p1, p2, and p3, are used to ascertain $\Phi_\parallel(x, y)$ and $\Phi_\perp(x, y)$, the two components that make up $\Phi(x, y, \alpha)$. Thus, $\Phi(x, y, \alpha)$ is a function of a, the angular head position of the viewer 105.

Figure 18:
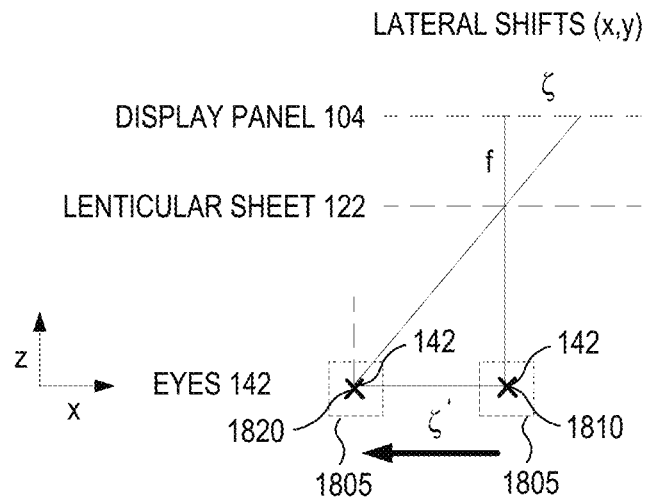
FIG. 18 depicts a movement technique of adjusting the lateral position of a headbox in accordance with various embodiments.
Figure 19:
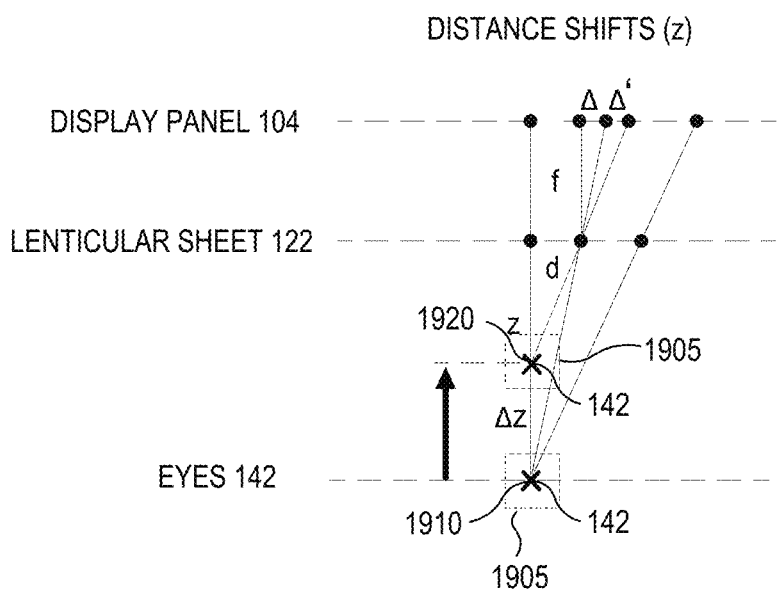
FIG. 19 depicts a movement technique of adjusting the lateral position of a headbox in accordance with various embodiments.

FIG. 18 and FIG. 19 illustrate techniques of adjusting the position of a headbox 1805 and a headbox 1905 associated with the viewer 105 of lenticular display 102 in accordance with various embodiments. With reference to FIG. 1, FIGS. 18 and 19 depict the position of display panel 104, the position of the lenticular sheet 122, and the position of the eyes 142 of the viewer 105 relative to the position of the display panel 104. In various embodiments, the lenticular display parameters, i.e., the lenticular focal length (f), the lenticular pitch (d), and the nominal screen distance (z) are used in combination of with the positioning of the eyes 142 to adjust the position of the headbox 1805 and headbox 1905.

In various embodiments, the headbox 1805 and the headbox 1905 are defined as a location where the head of the viewer 105 should be positioned in order to view the lenticular display 102 to take advantage of the lenticular distortion capabilities of the workstation 100. The headbox 1805 and the headbox 1905 may be, for example, a region of the physical space in which the display panel 104 can be viewed and the field of views of the camera to allow image and/or depth capture of the viewer 105. Typically, the borders of the headbox are not physically defined, but may be indicated to the viewer 105 on the display panel 104 using various techniques (e.g., a displaying a warning when the head of the viewer 105 leaves the headbox).

As the head 140 of viewer 105 is viewing the 3D image, the head of viewer 105, and thus the eyes 142 of the head 140 of viewer 105, may move in the lateral/vertical location. For example, the head of viewer 105 may move in the lateral direction corresponding to the xy-plane and/or z direction corresponding to the xz-plane. As the head of viewer 105 moves in the xy-plane (left or right), the swizzle function, which is a function of x and y, is adjusted to compensate for the movement. That is, in order to reposition the headbox 1805 and the headbox 1905 associated with the swizzle function depicted in Eq. 1, the k and r of Eq.1 are adjusted by a lateral adjuster δ for lateral movements and a distance adjuster Δd for distance movements (movements in the z direction). Thus, the swizzle function is able to shift in the lateral direction and the z-direction using δ and Δd given by the following adjustment equations. The lateral adjustment equation is:

$$\delta = \frac{f}{z}\delta' \qquad \text{Eq. 13}$$

where z is the distance from the eyes 142 of the head of viewer 105 to the display panel 104, f is the lenticular focal length, and δ' is the distance the eyes 142 have shifted in the x-direction. The lateral adjustment equation is indicative of the manner in which to shift the headbox 1805 in the x and y direction to compensate for viewer 105's head movement in the x, y plane and is added to the r of the swizzle function depicted in Eq. 1.

In addition, a distance equation may be used to compensate for changes in viewer 105's distance to the autostereoscopic display 106. The distance equation is:

$$\Delta d = \frac{f(\Delta z)d}{z^2} \qquad \text{Eq. 14}$$

where z is the distance from the eyes of the head 140 of viewer 105 to the display panel 104, f is the lenticular focal length, Δz is the change in the distance from the head of viewer 105 to the autostereoscopic display 106. Changing the period of the swizzle function Δd, can correct for the positioning of the head-box. Thus, the head-box position of viewer 105 may be adjusted using lenticular or scalar parameters. That is, Δd is added to the z-component of the swizzle function to adjust the headbox 1905 in the z-direction.

Figure 20:
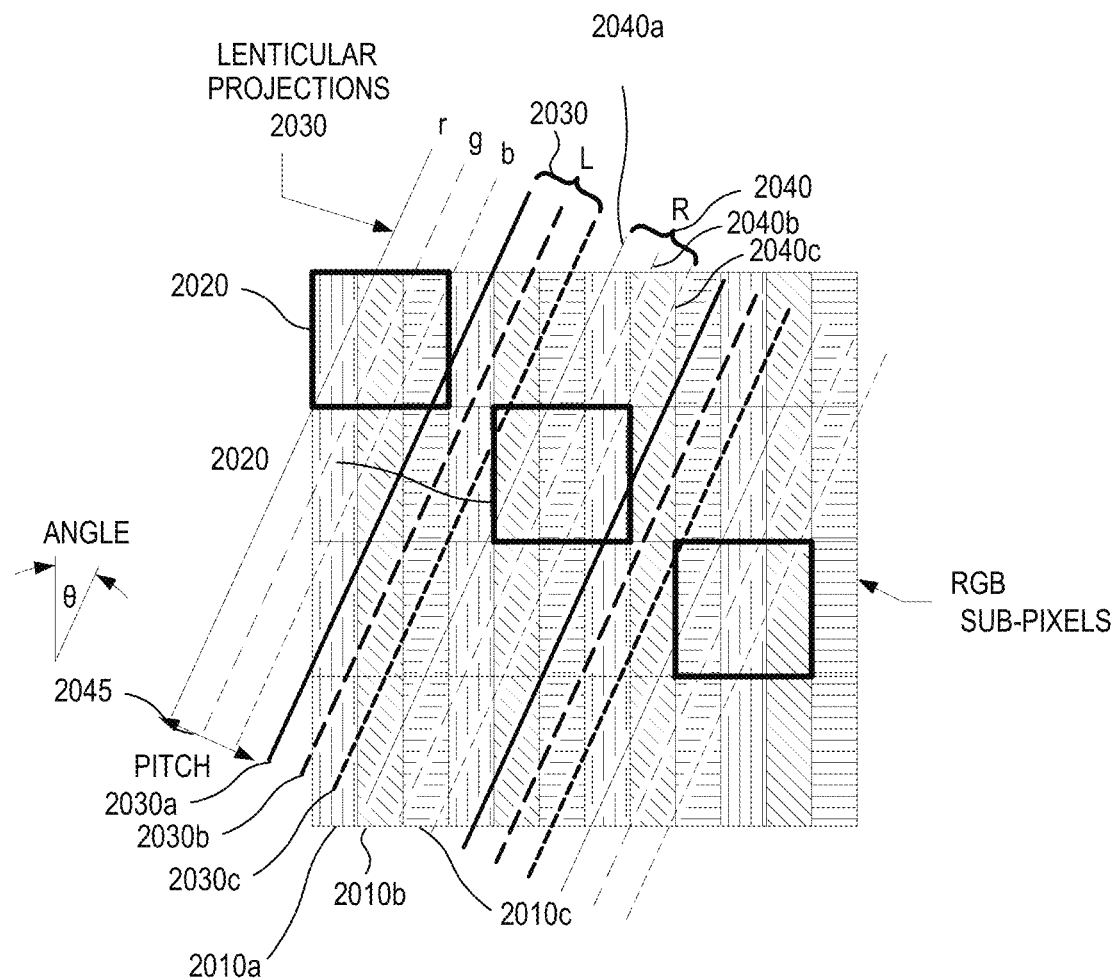
FIG. 20 depicts the pixel geometry of a display panel of FIG. 1 in accordance with various embodiments.

FIG. 20 illustrates the pixel geometry of the display panel 104 used in RGB sub-pixel compensation according to various embodiments. In various embodiments, display panel 104 includes an array of photon-emitting cells that are used to display images to the eyes of viewer 105. The photon-emitting cells may be implemented using any of a variety of well-known photon-emitting circuits. For example, the photon-emitting cells may be implemented as light-emitting diodes (LEDs), organic LEDs (OLEDs), liquid crystal display (LCD) cells, and the like. With reference to FIG. 1, to illustrate, the display panel 104 implements an RGB pixel geometry as is often found in LED-based and OLED-based displays. In such implementations, the LED cells of the array are arranged as groups referred to as "picture elements" or "pixels". Each pixel includes at least one LED cell for each base color, such as an LED cell configured to emit red-colored light (R), an LED cell configured to emit green-colored light (G), and an LED cell configured to emit blue-colored light (B).

In various embodiments, the columns 2010 repeat horizontally from left to right red (R) 2010a, green (G) 2010b, and blue (B) 2010c. The rectangles 2020 represent views of the images provided to viewer 105. The lens of the lenticular array 120 have a particular lens pitch 2045 and are slanted and thus have lenticular projections 2030a, 2030b, and 2030c that are slanted with angle θ relative to the column direction of columns 2010. The lenticular projections 2030 (i.e., 2030a, 2030b, and 2030c), correspond to lenticular projections designated for the left eye of viewer 105. The lenticular projections 2040 (i.e., 2040a, 2040b, and 2040c), correspond to lenticular projections designated for the right eye of viewer 105. Both the lenticular projections 2030 and the lenticular projections 2040 repeat in the slanted direction from left to right as r, g, and b, representing the colors red, blue, and green.

In order to compensate for the effects of the lenticular distortion map Φ(x, y, α) being added to the swizzle function, an RGB compensation, ΔRGB, is added to the r value of Eq. 1. and is defined as $$\text{RGB compensation} = \Delta RGB = \pm \left(\frac{pix}{3}\right)\cos(\theta) \qquad \text{Eq. 15}$$

where θ is angle of the lenticular slant (lenticular slant angle or angle of the lenticular array 120 with respect to the pixel column direction), pix is the lenticular pitch, and the positive ΔRGB value is added for a blue pixel shift and the negative ΔRGB value is added for red pixel shift. Thus, in order for processor 150 to apply RGB compensation, the swizzle function of Eq. 1 is written as:

$$S(\vec{k} \cdot \vec{r} + \overrightarrow{\Delta RGB} + \Phi(x, y, \alpha)) \qquad \text{Eq. 16}$$

For example, initially, the green pixel is located at a position indicated by $\vec{r}$. Using Eq. 15, the red pixel is shifted in a first direction, i.e., to the left, by $$-\left(\frac{pix}{3}\right)\cos(\theta)$$

and the blue pixel is shifted in a second direction, i.e., to the right, by $$+\left(\frac{pix}{3}\right)\cos(\theta).$$

By implementing RGB compensation, processor 150 is able to take into account the lenticular distortion maps and shift the red and green pixels by the appropriate amount indicated by Eq. 15.

Figure 21:
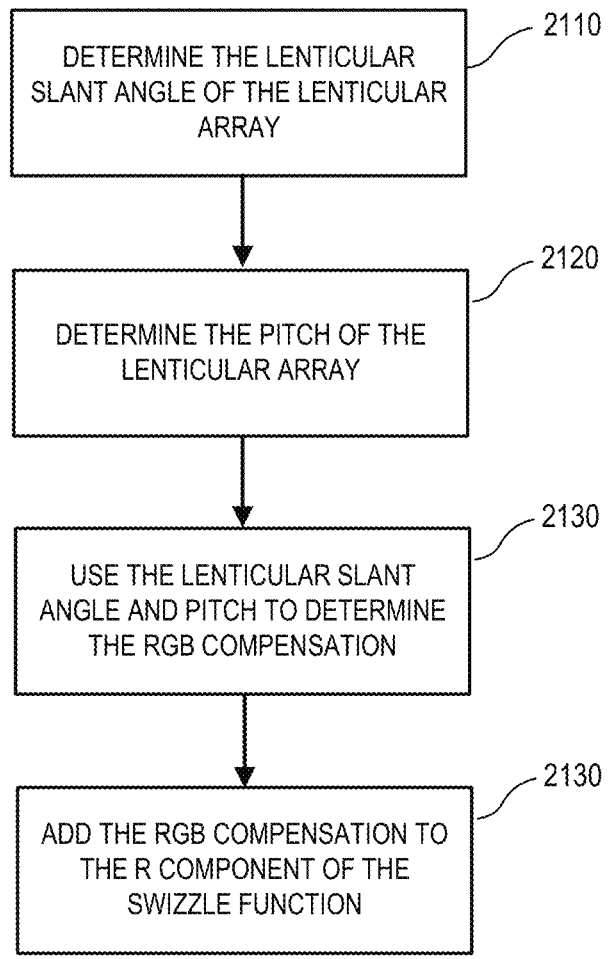
FIG. 21 is a flow diagram of a method of employing red-green-blue (RGB) compensation in lenticular distortion correction for an autostereoscopic display in accordance with at least one embodiment.

FIG. 21 illustrates a method of performing the RGB compensation illustrated in FIG. 20. With reference to FIG. 1, at block 2110, processor 150 determines the lenticular slant angle θ of Eq. 15. At block 2120, processor 150 determines the lenticular pitch pix of the lenticular array 120. At block 2130, processor 150 determines the RGB compensation by inputting the lenticular slant θ and the lenticular pitch pix into Eq. 15. The result of the RGB compensation (determined at block 2130) is then added to the $\vec{r}$ component of swizzle function (depicted in Eq. 16) at block 2130, where the RGB compensation is used to update the swizzle function that is configured to eliminate the lenticular distortion caused by lenticular sheet 122.

Figure 22:
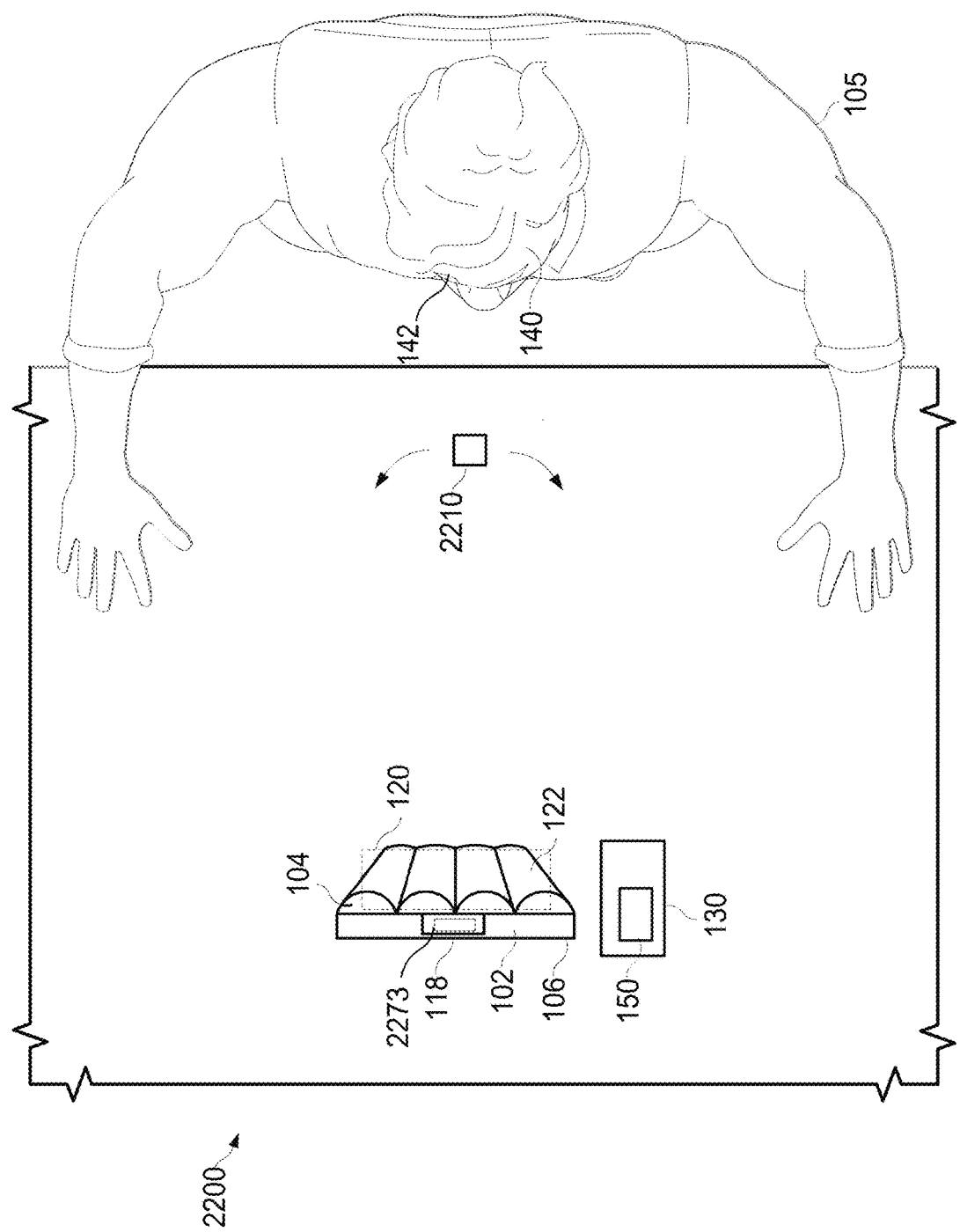
FIG. 22 is a diagram of a top view of a computer workstation including a perspective view of an autostereoscopic display in accordance with some embodiments.

FIG. 22 illustrates a top view of a workstation 1900 in accordance with some embodiments. Similar to the workstation 100 in FIG. 1, the workstation 2200 depicts an example implementation of a 3D system for video communication, except that instead of including a lenticular distortion tracking camera 110, workstation 2200 includes a mirror 2210 and a lenticular distortion tracking camera 2273. In various embodiments, the lenticular distortion tracking camera 2273 may be embedding in or a part of head tracking module 118.

In various embodiments, instead of using lenticular distortion tracking camera 110 to rectify the lenticular distortion of lenticular display 102, lenticular distortion tracking camera 2273 measures the lenticular distortion caused by lenticular sheet 122 using the image reflections of the lenticular display 102 provided by the mirror 2210. That is, lenticular distortion tracking camera 2273 determines the intensity distributions using the fringe patterns described with reference to FIG. 1, accept that the reflections of the fringe patterns are transformed using linear algebra prior to being used to rectify the lenticular distortion caused by lenticular sheet 122. Thus, the mirror 2210 is used to measure the intensity distribution of the fringe patterns associated with the reflected fringe images. In order to transform the reflected fringe patterns for use by processor 150, processor 150 workstation 2200 is configured to determine a lightfield distortion matrix using lenticular distortion tracking camera 2273. The processor 150 transforms the received images using the following equations:

$$M_{proj} * M_{prop}(z) * M_{dist} * L_{display}(x,u,y,v) = I_{camera}(X,y) \qquad \text{Eq. 17}$$

where $M_{proj}$ is the projection matrix, $M_{prop}$ is the ray transfer matrix, $L_{display}(x,u,y,v)$ is the lightfield distribution, and $I_{camera}(x,y)$ is the intensity distribution from the perspective of the lenticular distortion tracking camera 2273.

The $L_{display}(x,u,y,v)$ is solved for by taking the inverse of $M_{proj} * M_{prop}(x) * M_{dist}$ and multiplying the result by $I_{eyes}(x,y)$ $$L_{display}(x,u,y,v) = [M_{proj} * M_{prop}(z) * M_{dist}(z)]^{-1} * I_{eyes}(X,y) \qquad \text{Eq. 18}$$

where $I_{eyes}(x,y)$ is the intensity distribution from the perspective of eyes 142.

Figure 23:
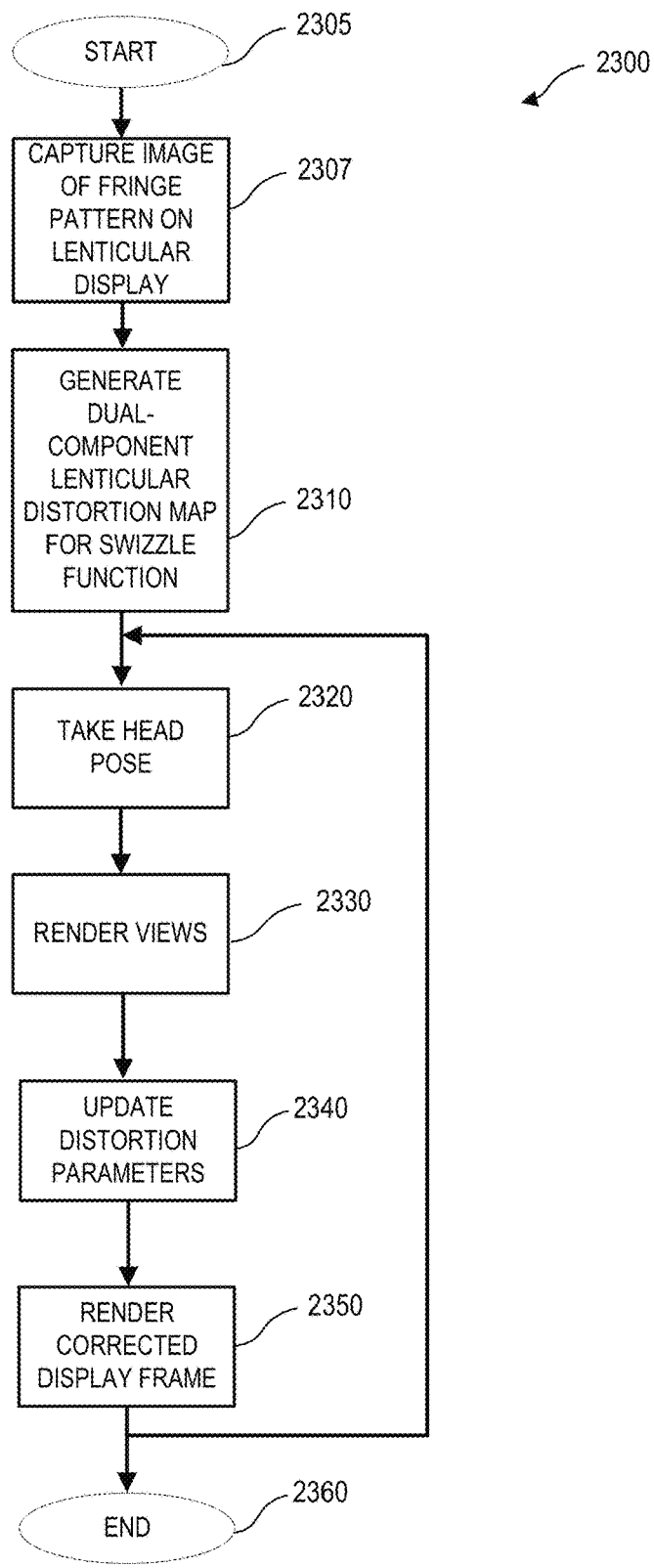
FIG. 23 is a flow diagram of a method of employing lenticular distortion correction for an autostereoscopic display in accordance with at least one embodiment.

FIG. 23 illustrates a flow diagram of a method 200 used for correcting lenticular distortion of an autostereoscopic display 106 in accordance with at least one embodiment. At block 2305, the method 2300 begins. With reference to FIG. 1 and FIG. 22, at block 2307, the lenticular distortion tracking camera 110 (or lenticular distortion tracking camera 2273) is employed to capture images (e.g., fringe patterns) displayed on the lenticular display 102 to generate intensity patterns (Eqs. 4-7). At block 2310, the intensity patterns are used to generate the lenticular distortion maps of the dual-component lenticular distortion map used in the swizzle function.

At block 2320, the workstation 100 employs head tracking module 118 to take a head pose measurement of the viewer 105. In various embodiments, the head tracking module 118 measures the location of the head 140 relative to the lenticular display 102, i.e., provides the angle α and the nominal distance d from viewer 105 to processor 150 for use by the swizzle function.

At block 2315, the lenticular display 102 renders left and right views for view by the viewer 105. At block 2320, the processor 150 updates the lenticular display parameters and the lenticular distortion map of the swizzle function. At block 2325, the processor 150 uses the updated swizzle function to render the corrected display frame to the lenticular display 102. The process then loops back to block 2320 for further lenticular distortion correction based on the current positioning of the viewer 105. At block 2360, the method 2300 ends.

In various embodiments, the lenticular distortion tracking cameras described herein may also be considered calibration tracking cameras used, for example, to calibrate the autostereoscopic display 106 during the manufacture of autostereoscopic display 106. In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
capturing an image of a fringe pattern displayed on a lenticular display;
generating a lenticular distortion map of the lenticular display using the image; and
compensating for a lenticular distortion of the lenticular display using the lenticular distortion map, wherein the lenticular distortion map is a function of a lenticular display observation angle.

2. The method of claim 1, wherein:
the lenticular distortion map is a dual-component lenticular distortion map.

3. The method of claim 2, wherein:
the dual-component lenticular distortion map is based on pose data representative of an angular position of a head pose of a viewer of the lenticular display.

4. The method of claim 2, wherein:
the dual-component lenticular distortion map is based on lenticular display parameters, the lenticular display parameters being at least one of a lenticular pitch of the lenticular display, a lenticular angle of the lenticular display, a lenticular focal length of the lenticular display, a distance from a viewer to the lenticular display, and a pixel pitch of a plurality of pixels of the lenticular display.

5. The method of claim 1, wherein:
compensating for the lenticular distortion comprises:
adjusting a swizzle function based on the lenticular distortion map.

6. A method, comprising:
capturing an image of a fringe pattern displayed on a lenticular display;
generating a lenticular distortion map of the lenticular display using the image; and
compensating for a lenticular distortion of the lenticular display using the lenticular distortion map wherein, the lenticular distortion map is a dual-component lenticular distortion map and the dual-component lenticular distortion map is generated using a parallel lenticular distortion map and a perpendicular lenticular distortion map.

7. The method of claim 6, wherein:
the parallel lenticular distortion map and the perpendicular lenticular distortion map are generated using a first lenticular distortion map, a second lenticular distortion map, and a third lenticular distortion map.

8. The method of claim 7, wherein:
the first lenticular distortion map, the second lenticular distortion map, and the third lenticular distortion map are generated based on a first angle, a second angle, and third angle.

9. The method of claim 8, wherein:
the first lenticular distortion map, the second lenticular distortion map, and the third lenticular distortion map are generated based on intensity patterns of the image.

10. An apparatus, comprising:
a lenticular distortion tracking camera;
a lenticular display coupled to the lenticular distortion tracking camera, the lenticular distortion tracking camera configured to capture an image of a fringe pattern displayed on the lenticular display; and
a processor coupled to the lenticular distortion tracking camera and the lenticular display, wherein the processor generates a lenticular distortion map of the lenticular display using the image and compensates for a lenticular distortion of the lenticular display using the lenticular distortion map, wherein the lenticular distortion map is a function of a lenticular display observation angle.

11. The apparatus of claim 10, wherein:
the lenticular distortion map is a dual-component lenticular distortion map.

12. The apparatus of claim 11, wherein:
the dual-component lenticular distortion map is based on an angular position of a head of a viewer of the lenticular display.

13. The apparatus of claim 11, wherein:
the dual-component lenticular distortion map is based on lenticular display parameters, the lenticular display parameters being at least one of a lenticular pitch of the lenticular display, a lenticular angle of the lenticular display, a lenticular focal length of the lenticular display, a distance from a viewer to the lenticular display, and a pixel pitch of a plurality of pixels of the lenticular display.

14. The apparatus of claim 10, wherein:
the processor compensates for the lenticular distortion by adjusting a swizzle function based on the lenticular distortion map.

15. An apparatus, comprising:
a lenticular distortion tracking camera;
a lenticular display coupled to the lenticular distortion tracking camera, the lenticular distortion tracking camera configured to capture an image of a fringe pattern displayed on the lenticular display;
a processor coupled to the lenticular distortion tracking camera and the lenticular display, wherein the processor generates a lenticular distortion map of the lenticular display using the image and compensates for a lenticular distortion of the lenticular display using the lenticular distortion map, wherein the lenticular distortion map is a dual-component lenticular distortion map; and
the dual-component lenticular distortion map is generated using a parallel-lenticular distortion map and a perpendicular lenticular distortion map.

16. The apparatus of claim 15, wherein:
the parallel lenticular distortion map and the perpendicular lenticular distortion map are generated using a first lenticular distortion map, a second lenticular distortion map, and a third lenticular distortion map.

17. The apparatus of claim 16, wherein:
the first lenticular distortion map, the second lenticular distortion map, and the third lenticular distortion map are generated based on a first angle, a second angle, and third angle.

18. The apparatus of claim 17, wherein:
the first lenticular distortion map, the second lenticular distortion map, and the third lenticular distortion map are generated based on intensity patterns of the image.

19. A method, comprising:
receiving an image of a lenticular display from a lenticular distortion tracking camera;
determining a lenticular distortion map from the image;
using the lenticular distortion map to calculate a swizzle function; and
compensating for a lenticular distortion of the lenticular display by adding the lenticular distortion map to the swizzle function, wherein the lenticular distortion map is a function of a lenticular display observation angle.

20. The method of claim 19, wherein:
the swizzle function includes a first component and a second component, the first component being a parallel component and the second component being a perpendicular component.

* * * * *